United States Patent
Sosa et al.

(10) Patent No.: US 11,685,212 B2
(45) Date of Patent: Jun. 27, 2023

(54) HYDRAULIC JOUNCE BUMPER WITH IMPROVED INSTALLATION

(71) Applicant: Ford Global Technologies, LLC, Dearborn, MI (US)

(72) Inventors: Fernando Sosa, West Bloomfield, MI (US); Jack Wiley Cooper, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 17/527,269

(22) Filed: Nov. 16, 2021

(65) Prior Publication Data

US 2023/0150328 A1    May 18, 2023

(51) Int. Cl.
*B60G 15/06* (2006.01)
*B60G 3/01* (2006.01)

(52) U.S. Cl.
CPC ............. *B60G 15/063* (2013.01); *B60G 3/01* (2013.01)

(58) Field of Classification Search
CPC ........ B60G 15/063; B60G 3/01; B60G 11/16; B60G 7/04; F16F 1/126
See application file for complete search history.

(56) References Cited

U.S. PATENT DOCUMENTS

| | | | |
|---|---|---|---|
| 5,467,970 A | 11/1995 | Ratu et al. | |
| 6,254,072 B1 | 7/2001 | Bono et al. | |
| 6,857,626 B2 * | 2/2005 | Burlage | F16F 1/44 280/124.179 |
| 2006/0027954 A1 * | 2/2006 | Nesbitt | F16F 9/49 267/64.11 |
| 2008/0179148 A1 * | 7/2008 | Quinn | F16F 13/06 188/322.13 |

FOREIGN PATENT DOCUMENTS

| | | | |
|---|---|---|---|
| CN | 209146204 U | 7/2019 | |
| JP | H1095217 A | 4/1998 | |
| WO | WO-2021038143 A1 * | 3/2021 | ............. B60G 15/06 |

* cited by examiner

*Primary Examiner* — Paul N Dickson
*Assistant Examiner* — Kurtis Nielson
(74) *Attorney, Agent, or Firm* — Burr and Forman LLP; Lorne Forsythe (57) ABSTRACT

A damping assembly for a vehicle suspension system may include a spring including a first end operably coupled to a body of a vehicle and a second end operably coupled to a wheel assembly of the vehicle, a spring isolator operably coupling the body of the vehicle to the first end of the spring, a hydraulic jounce bumper to dampen jounce forces on the vehicle, and a reinforcement member operably coupled to the hydraulic jounce bumper at a proximal end of the reinforcement member and to the spring isolator at a distal end of the reinforcement member. The reinforcement member may be integrated with the spring isolator at the distal end of the reinforcement member.

16 Claims, 5 Drawing Sheets

HYDRAULIC JOUNCE BUMPER WITH IMPROVED INSTALLATION

TECHNICAL FIELD

Example embodiments generally relate to vehicle suspension and, more particularly, relate to a suspension system with an easy to install jounce bumper for a suspension damper or shock absorber.

BACKGROUND

Vehicles commonly employ independent suspension systems that allow each wheel to move relative to the vehicle chassis independent of the other wheels. The components and geometries used for independent suspension designs can vary to some degree. However, a typical independent suspension system will employ dampers or shock absorbers (or simply "shocks") that are designed to provide damping for pitch (i.e., oscillation about a lateral axis of the vehicle). The shocks generally resist compression and rebound with damping forces that are applied over a range of travel of a piston rod. The shocks selected for a particular vehicle are generally chosen based on the expectation of normal pitch scenarios that are encountered during routine driving conditions. Some typical suspension components that may be considered for selection include springs and dampers (e.g., gas shocks).

In addition to shocks, many independent suspension systems also employ jounce bumpers (i.e. bump stops). Jounce bumpers are known to reduce the impact on the suspension components when under full compression from abrupt changes in driving conditions. In some cases, jounce bumpers are embodied as blocks of rubber or some other shock absorbent material that are placed somewhere between the axle tube that connects to the wheel and the body of the vehicle to prevent damage therebetween. These jounce bumpers, although useful, typically require an additional bracket assembly or weldment to be employed for installation, which adds complication and reduces efficiency.

BRIEF SUMMARY OF SOME EXAMPLES

In accordance with an example embodiment, a damping assembly for a vehicle suspension system may be provided. The damping assembly may include a spring including a first end operably coupled to a body of a vehicle and a second end operably coupled to a wheel assembly of the vehicle, a spring isolator operably coupling the body of the vehicle to the first end of the spring, a hydraulic jounce bumper to dampen jounce forces on the vehicle, and a reinforcement member operably coupled to the hydraulic jounce bumper at a proximal end of the reinforcement member and to the spring isolator at a distal end of the reinforcement member. The reinforcement member may be integrated with the spring isolator at the distal end of the reinforcement member.

In another example embodiment, a suspension system for a vehicle may be provided. The suspension system may include a wheel assembly of the vehicle, a body of the vehicle, and a damping assembly operably coupling the wheel assembly and the body to dampen impacts on the body of the vehicle responsive to jounce and rebound events experienced at the wheel assembly. The damping assembly may include a spring including a first end operably coupled to the body of a vehicle and a second end operably coupled to the wheel assembly of the vehicle, a spring isolator operably coupling the body of the vehicle to the first end of the spring, a hydraulic jounce bumper to dampen jounce forces on the vehicle, and a reinforcement member operably coupled to the hydraulic jounce bumper at a proximal end of the reinforcement member and to the spring isolator at a distal end of the reinforcement member. The reinforcement member may be integrated with the spring isolator at the distal end of the reinforcement member.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Some example embodiments described herein may address the problems described above. In this regard, for example, some embodiments may provide an improved damping assembly or suspension system design that is also easy to install. In particular, example embodiments may be installed without any requirement for additional bracket assemblies or weldments to be employed.

Figure 1:
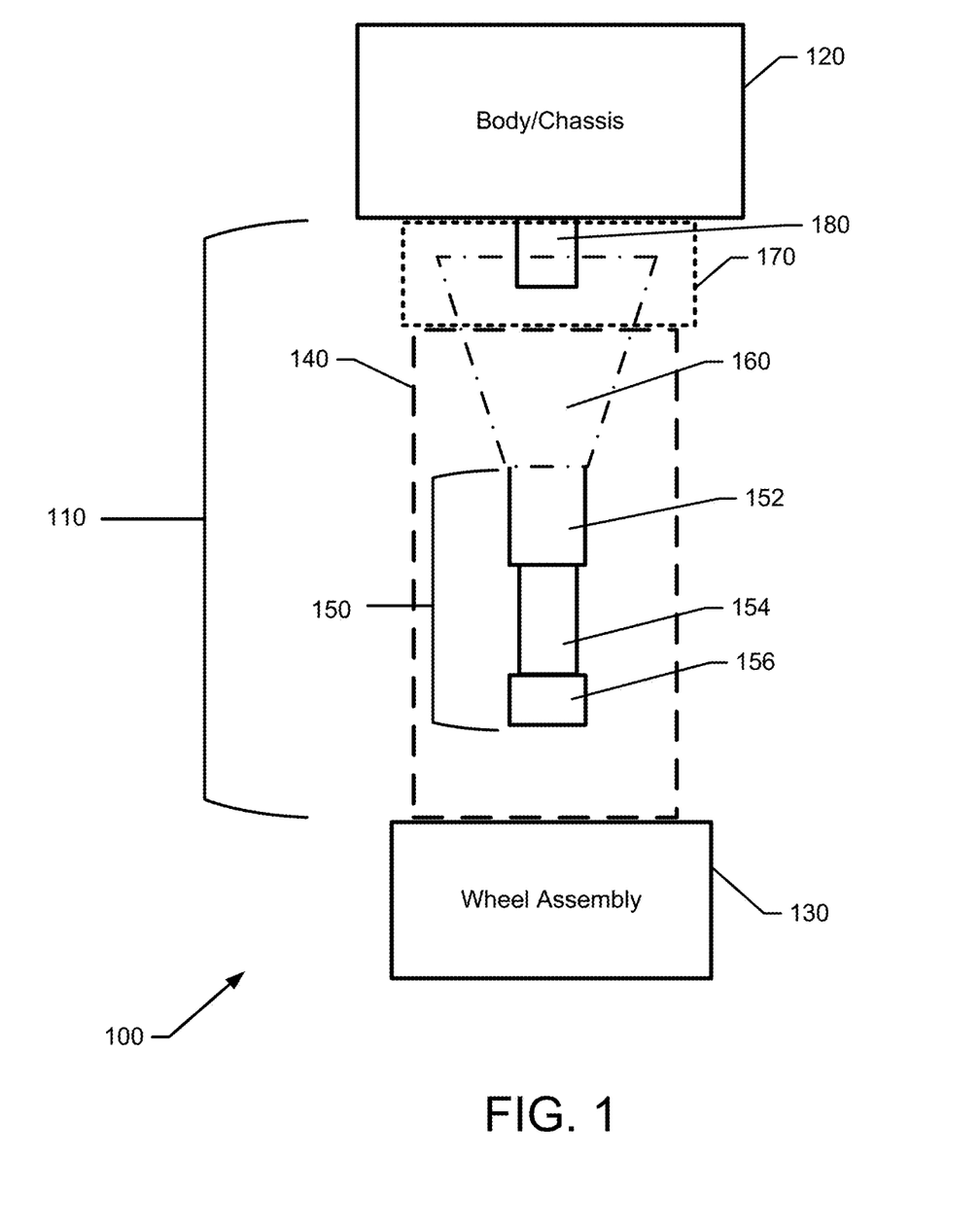
FIG. 1 illustrates a block diagram of a vehicle suspension system in accordance with an example embodiment.

FIG. 1 illustrates a block diagram of a vehicle suspension system 100 employing a damping assembly 110. The damping assembly 110 may be used to dampen jounce and rebound forces that may be initiated between a body or chassis 120 of the vehicle and a wheel assembly 130 (which may include each individual wheel and other suspension system components that support the corresponding wheels). Bumps or obstacles in a terrain over which a vehicle is being operated may cause the wheel and wheel assembly 130 to articulate varying amounts depending on how the vehicle is driven and the size of the obstacle in the terrain. Thus, the vehicle's suspension system 100 may reach full compression at certain points depending on the articulation distance the wheel assembly 130 may be required to travel. In other words, the wheel assembly 130 may be forced towards the body 120 and at this point the suspension system 100 may be at full compression. Thus there may be potential for the wheel assembly 130 to impart a significant jounce force on other components in the suspension system 100. The wheel assembly 130 making forceful contact with other elements of the suspension system 100 may lead to the components of the suspension system 100 impacting each other. In this regard, the damping assembly 110 may be prevent or mitigate any such impact occurring to components of the suspension system 100 as a result of jounce forces from the wheel assembly 130.

In some embodiments, the damping assembly 110 operably couples the chassis 120 to the wheel assembly 130. The damping assembly 110 may include a spring 140, a hydraulic jounce bumper 150, a reinforcement member 160, and a spring isolator 170. In some embodiments, the vehicle suspension system 100 may also include a shock absorber (not pictured) that may be separate from the damping assembly 110, and may also operably couple the body 120 to the wheel assembly 130. The spring 140 may be configured to compress or decompress responsive to the wheel assembly 130 articulation as the vehicle traverses uneven terrain. The spring 140 may therefore be disposed such that a first end of the spring 140 is operably coupled to the body 120 (via a spring isolator 170), and a second end of the spring is operably coupled to the wheel assembly 130. Spring seats or other intermediate components may therefore also be understood to be provided at the first and second ends of the spring 140 in some cases. The spring 140 may also be disposed around the hydraulic jounce bumper 150 such that the hydraulic jounce bumper 150 is disposed inside and at a center of the spring 140. In some embodiments, the spring 140 may be designed to compress a predetermined amount before the wheel assembly 130 comes into contact with the hydraulic jounce bumper 150. In this regard, the hydraulic jounce bumper 150 may extend to a total length that is less than the distance between the first end and the second end of the spring 140. Accordingly, the hydraulic jounce bumper 150 may not be engaged as a result of the wheel assembly 130 articulating a small amount due to the vehicle traversing a small obstacle. In other words, the hydraulic jounce bumper 150 may only make contact with the wheel assembly 130 when the wheel assembly 130 articulates a large amount with great force. In this regard, the hydraulic jounce bumper 150 is more of a backup feature to be used as protection for extreme jounce events, and is different from a shock absorber designed to provide a smoother ride for the vehicle during normal ride conditions.

The hydraulic jounce bumper 150 may further include a sleeve 152, a rod 154 and an bump member 156. The hydraulic jounce bumper sleeve 152 may be configured to slidably fit over the hydraulic jounce bumper rod 154. In this regard, the rod 154 may be configured to slide into and out of the sleeve 152 as a result of the external jounce forces imparted on the hydraulic jounce bumper 150 by the wheel assembly 130. In some embodiments, the sleeve 152 may be filled with a fluid, e.g., of gaseous or liquid nature, to aid in resisting sudden forceful movements of the hydraulic jounce bumper rod 154 and thus dampen the jounce forces of the wheel assembly 130. The bump member 156 of the hydraulic jounce bumper 150 may be fixedly operably coupled to the rod 154 such that the bump member 156 and the rod 154 move together. The bump member 156 of the hydraulic jounce bumper 150 may be where the wheel assembly 130 (or a portion of the suspension system 100 operably coupled thereto) makes contact with the hydraulic jounce bumper 150 in the event that the spring 140 has compressed beyond the predetermined amount. Responsive to the wheel assembly 130 (or the portion of the suspension system 100 operably coupled thereto) imparting a jounce force on the bump member 156 of the hydraulic jounce bumper 150, the rod 154 may slide into the sleeve 152 filled with a compressible fluid in order to dampen the force felt on the body 120.

The reinforcement member 160 may be operably coupled to the hydraulic jounce bumper 150. The reinforcement member 160 may be structured to further distribute and dampen jounce forces from the hydraulic jounce bumper 150. The reinforcement member 160 may also be configured to secure the hydraulic jounce bumper 150 in a proper functioning position at the center of the spring 140. In some embodiments, the reinforcement member 160 may be conical in shape. The reinforcement member 160 may be operably coupled to the hydraulic jounce bumper 150 at a narrow end, and may get wider moving away from the operable coupling with the hydraulic jounce bumper 150 and towards the body 120 at a wide end of the reinforcement member 160. Additionally, the reinforcement member 160 may be formed from a metallic material in order to provide adequate rigidity and strength to ensure the hydraulic jounce bumper 150 can withstand large repeated jounce forces.

The reinforcement member 160 may be operably coupled to a spring isolator 170 at the wide end of the reinforcement member 160. In this regard, a portion of the reinforcement member 160 may extend into, and may be integrated with, the spring isolator 170 which will be discussed in greater detail below in reference to later figures. In some embodiments, the spring isolator 170 may be disposed between the body 120 and the first end of the spring 140. As such, the spring isolator 170 may be fixedly operably coupled to the spring 140 such that the spring isolator 170 isolates the body 120 from the spring 140. In this regard, the forces generated by the compression of the spring 140 may not be directly transferred to the body 120, but rather may be transferred indirectly via the spring isolator 170. In some embodiments, the spring isolator 170 may comprise a rubber or composite material that is compressible, or some other type of shock absorbent material, which may help isolate the body 120 from the forces and vibrations transferred through the spring 140 from the wheel assembly 130. In some embodiments, the spring isolator 170 may be shaped like a ring, where the center of the spring isolator 170 may be open. On the outer edge of the spring isolator 170, where the spring isolator 170 contacts the spring 140, there may be a lip configured to operably couple to the first end of the spring 140. The lip may be formed so that the spring 140 naturally seats itself within the lip of the spring isolator 170. The hydraulic jounce bumper 150 may extend through the center of the reinforcement member 160, and in some embodiments, at least part of the spring isolator 170. In this regard, the hydraulic jounce bumper 150 may not extend all the way through the spring isolator 170, leaving some room between the end of the hydraulic jounce bumper 150 and an end of the spring isolator 170.

In some embodiments, the open space inside the ring of the spring isolator 170, and between the hydraulic jounce bumper 150 and the body 120, may operably couple with a locator 180. The locator 180 may provide a secure connection between the damping assembly 110 and the body 120. In this regard, the locator 180 may be operably coupled to the body 120 to provide a consistent location for, and retention of, the spring isolator 170. In some embodiments, the locator 180 may be fixedly operably coupled with a portion of the body 120 (e.g., via bolts, welds, or other fixing means). Additionally, as previously mentioned, the locator 180 may provide a seat that is configured to relatively tightly fit inside the center of the spring isolator 170 so that lateral motion of the spring isolator 170 is prevented. Therefore, the damping assembly 110 may be placed into position over the locator 180 by hand and without the need for further fastening via welding or bolting between the damping assembly 110 and the body 120 or wheel assembly 130. In some embodiments, the force of the spring 140 against the spring isolator 170 may be sufficient to keep the damping assembly 110 in the correct orientation on the locator 180, and the locator 180 may extend far enough into the spring isolator 170 to prevent unseating of the spring isolator 170 from the locator 180 even in the event of a significant rebound event. Accordingly, the use of the spring isolator 170 with the locator 180 may offer numerous improvements to the vehicle manufacturing process. Namely, it may reduce the time and effort required to install the damping assembly 110, the total number of parts needed to produce the vehicle, and it may also increase efficiency of producing the vehicle as a function of reducing the time and number of parts needed for installation.

Figure 2:
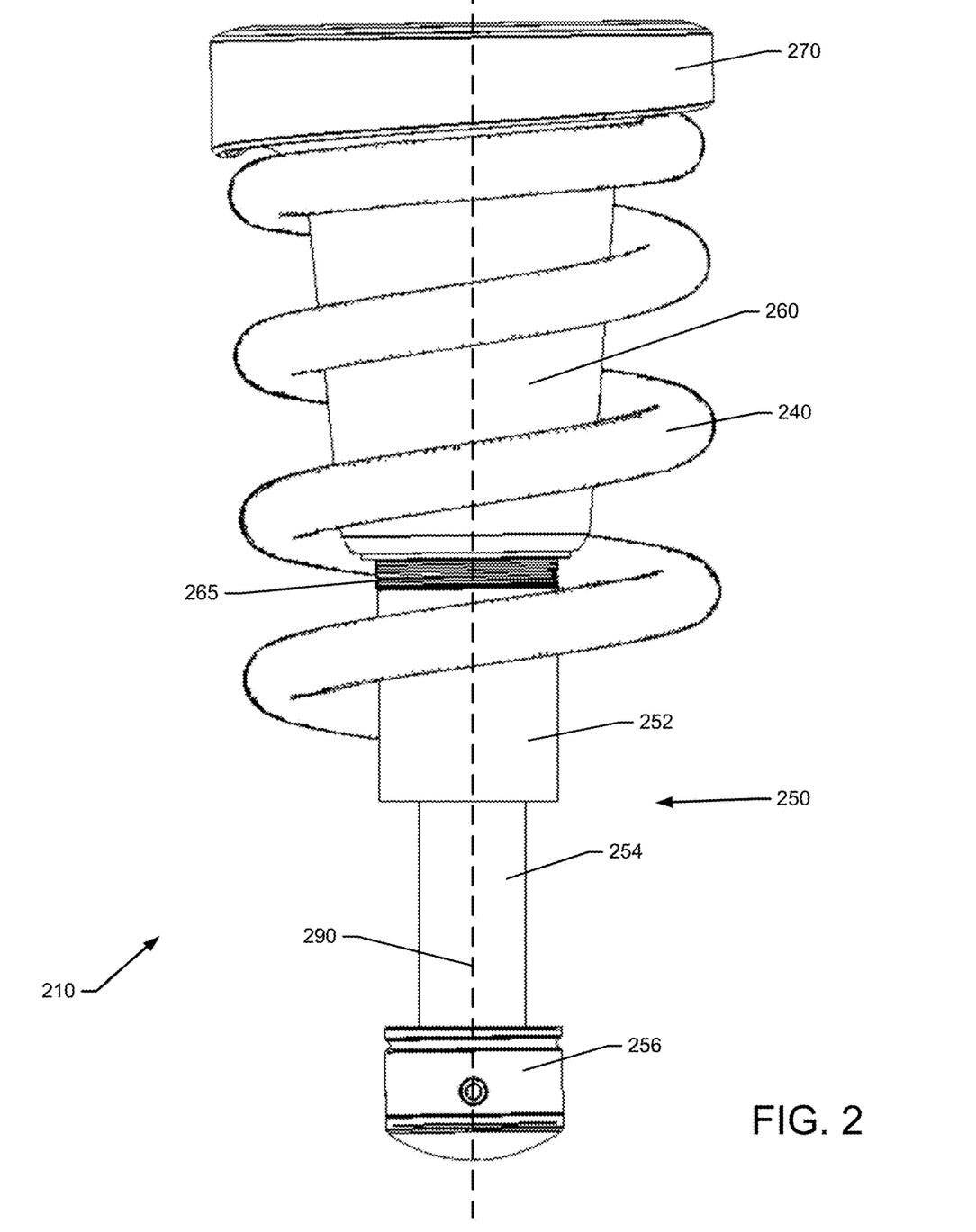
FIG. 2 illustrates a side view of a damping assembly in accordance with an example embodiment.

FIG. 2 shows a specific example of some structures that may be employed to instantiate the components described above. In this regard, a damping assembly 210, which is illustrated in FIG. 2, may include spring 240 and hydraulic jounce bumper 250. The hydraulic jounce bumper 250 may include a sleeve 252, rod 254 and bump member 256 that correspond to similarly named (but differently numbered) items described above in reference to FIG. 1. The damping assembly 210 may further include a reinforcement member 260, and spring isolator 270. In this embodiment, it should be appreciated that the spring 240 may extend further down than is shown in FIG. 2 so that it extends beyond the bump member 256 of the hydraulic jounce bumper 250. In some embodiments, the spring 240, the hydraulic jounce bumper 250, the reinforcement member 260 and the spring isolator 270 may all be coaxial about a longitudinal axis 290. As such, the spring 240 and the hydraulic jounce bumper 250 may both compress and decompress in the same direction parallel to axis 290. In some embodiments, the reinforcement member 260 may be adjustably operably coupled to the hydraulic jounce bumper 250. In this regard, a threaded connection 265 may be provided on the outer surface of the sleeve 252 of the hydraulic jounce bumper 250. The threaded connection 265 may define an adjustable point at which the reinforcement member 260 contacts the hydraulic jounce bumper 250. In this regard, the hydraulic jounce bumper 250 may be threaded to a desired position with respect to the reinforcement member 260, effectively altering the predetermined amount of compression that the spring 240 must experience before the wheel assembly 130 engages bump member 256 of the hydraulic jounce bumper 250. Furthermore, the threaded connection 265 may allow for the hydraulic jounce bumper 250 to be fine-tuned to achieve acceptable noise, vibrations and harshness (NVH) levels. In some embodiments, the threaded connection 265 may include a locking nut that may also operably couple to the threaded connection 265 on the sleeve 252 and which may secure the hydraulic jounce bumper 250 in place on the reinforcement member 260 at the desired adjustable point. In some other embodiments, the reinforcement member 260 may be fixedly operably coupled to the hydraulic jounce bumper 250 (e.g., to the sleeve 252 of the hydraulic jounce bumper 250). In this regard, the threaded connection 265 may not be provided, and as such, the position of the hydraulic jounce bumper 250 relative to the reinforcement member 260 may not be adjustable.

Figure 3A:
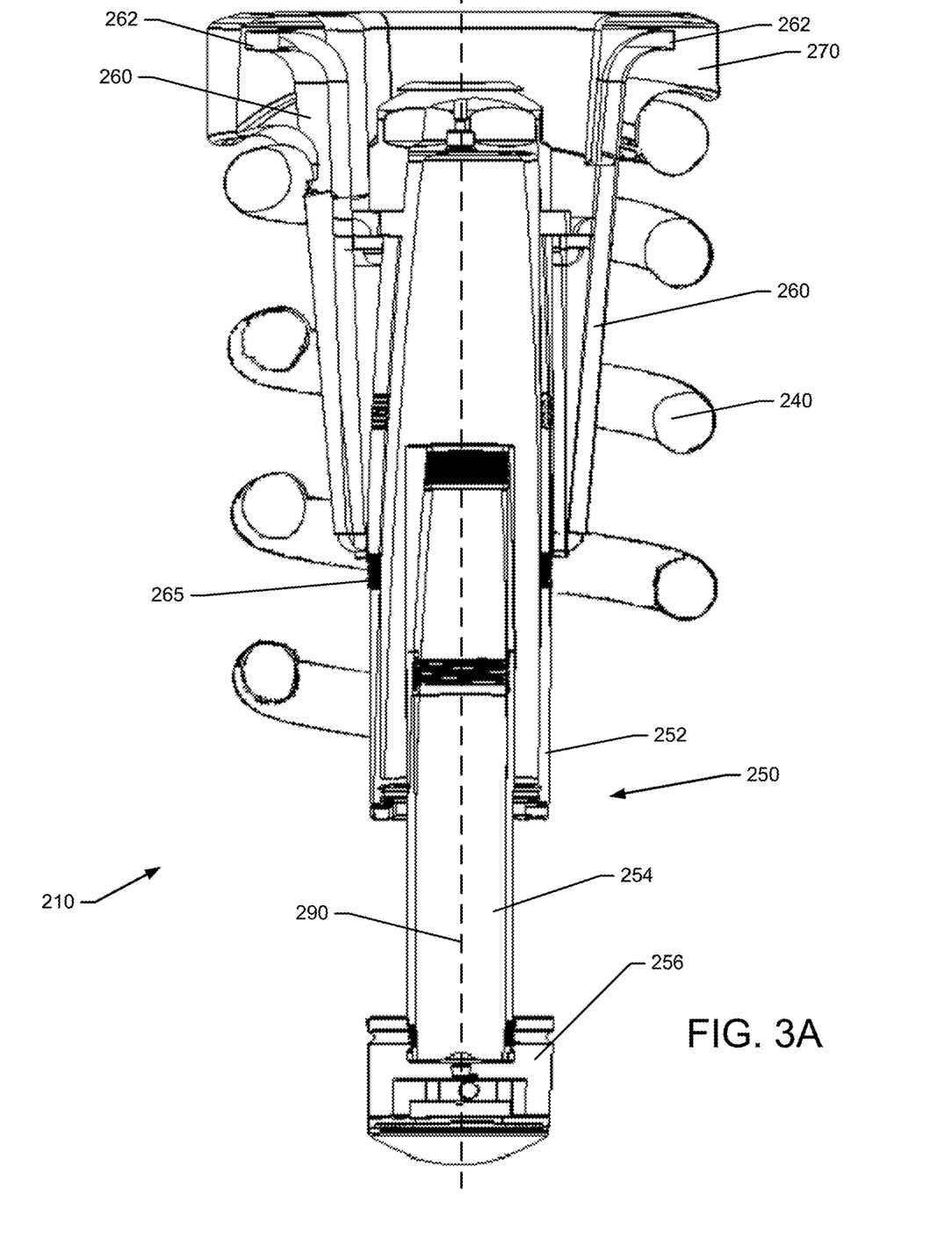
FIG. 3A illustrates a section view of the damping assembly with the jounce bumper extended in accordance with an example embodiment.
Figure 3B:
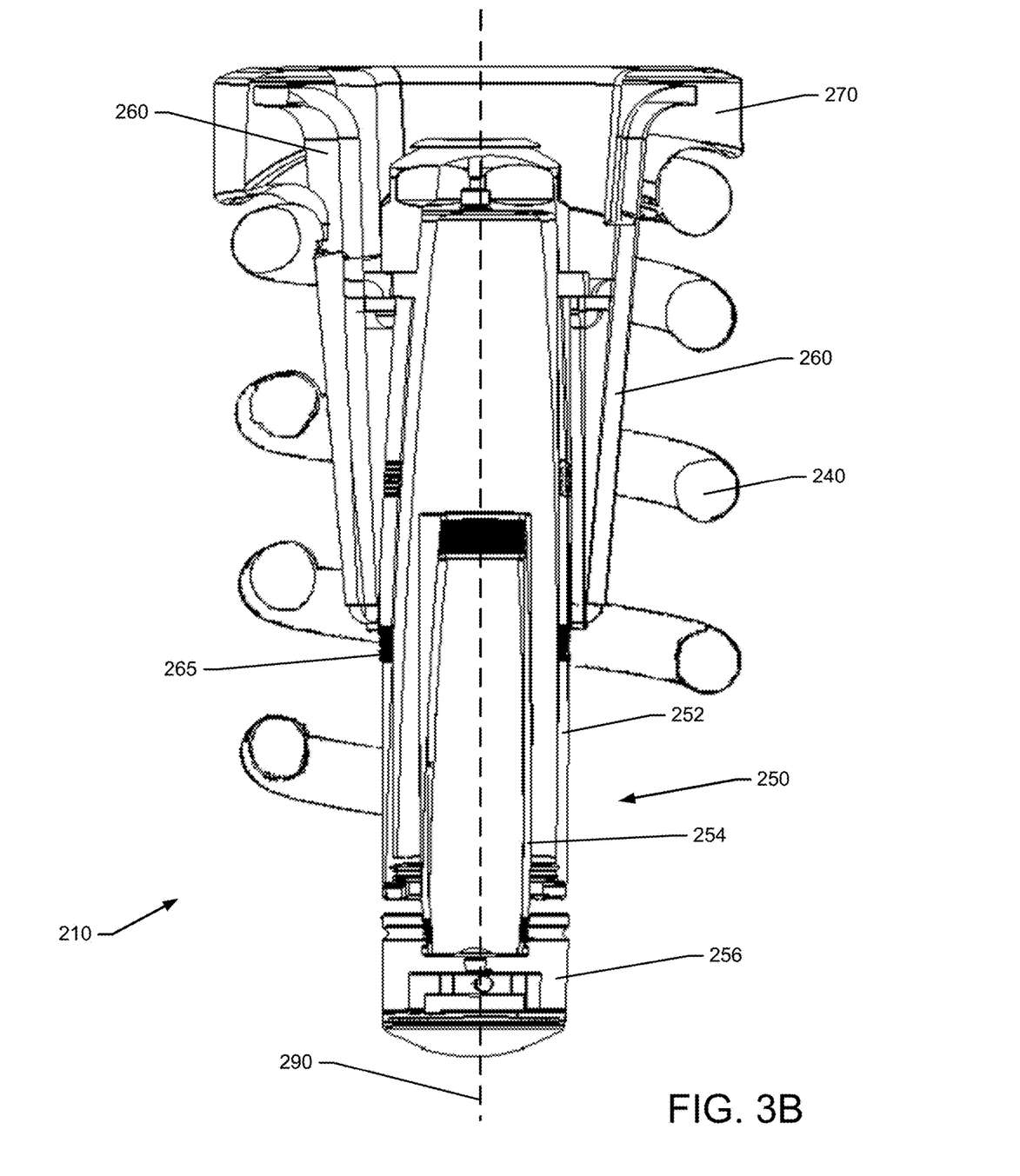
FIG. 3B illustrates a section view of the damping assembly with the jounce bumper compressed in accordance with an example embodiment.

FIGS. 3A and 3B, show respective cross section views of the damping assembly 210 shown in FIG. 2. In particular, FIG. 3A depicts the damping assembly 210 in an uncompressed state, or in other words, the rod 254 of the hydraulic jounce bumper 250 is shown at full extension rather than full compression. FIG. 3B, on the other hand, depicts the damping assembly 210 in a compressed state, or in other words, the rod 254 of the hydraulic jounce bumper 250 is shown at full compression rather than full extension. In the section views provided by FIGS. 3A and 3B, the reinforcement member 260 is shown to extend into, and be integrated within, the spring isolator 270. In this regard, the spring isolator 270 may comprise solid rubber or some other shock absorbing material, and the reinforcement member 260 may be integrally formed inside of the solid rubber spring isolator 270. The integration of the reinforcement member 260 with the spring isolator 270 may allow the reinforcement member 260 to act as the fastening method for the damping assembly 210. In an example embodiment, the spring isolator 270 may be molded around the reinforcement member 260 to integrate the components together in a tight coupling. In this regard, the reinforcement member 260, although generally conical in shape, includes a flared end portion 262 that is completely surrounded by the spring isolator 270, and which is captured within the spring isolator 270. The flared end portion 262, which is at the distal end of the reinforcement member 260 relative to the threaded connection 265 in some examples, is therefore provided to enable the fixing of the reinforcement member 260 to the spring isolator 270 in a consistent orientation, and without any other fixing means provided therebetween. In some cases, a thickness of rubber or other material forming the spring isolator 270 is consistent at all point relative to the flared end portion 262. However, a thickness of the rubber or other material forming the spring isolator below the flared end portion 262 changes to conform to the shape of the spring 240. Accordingly, integrating the reinforcement member 260 with the spring isolator 270 may simplify the installation process of the damping assembly 210 and thus cut down on vehicle production time while improving efficiency. Additionally, integrating the reinforcement member 260 with the spring isolator 270 may enhance the jounce force distribution of the damping assembly 110 as well as reduce NVH levels between the reinforcement member 260 and the spring isolator 270.

Figure 4:
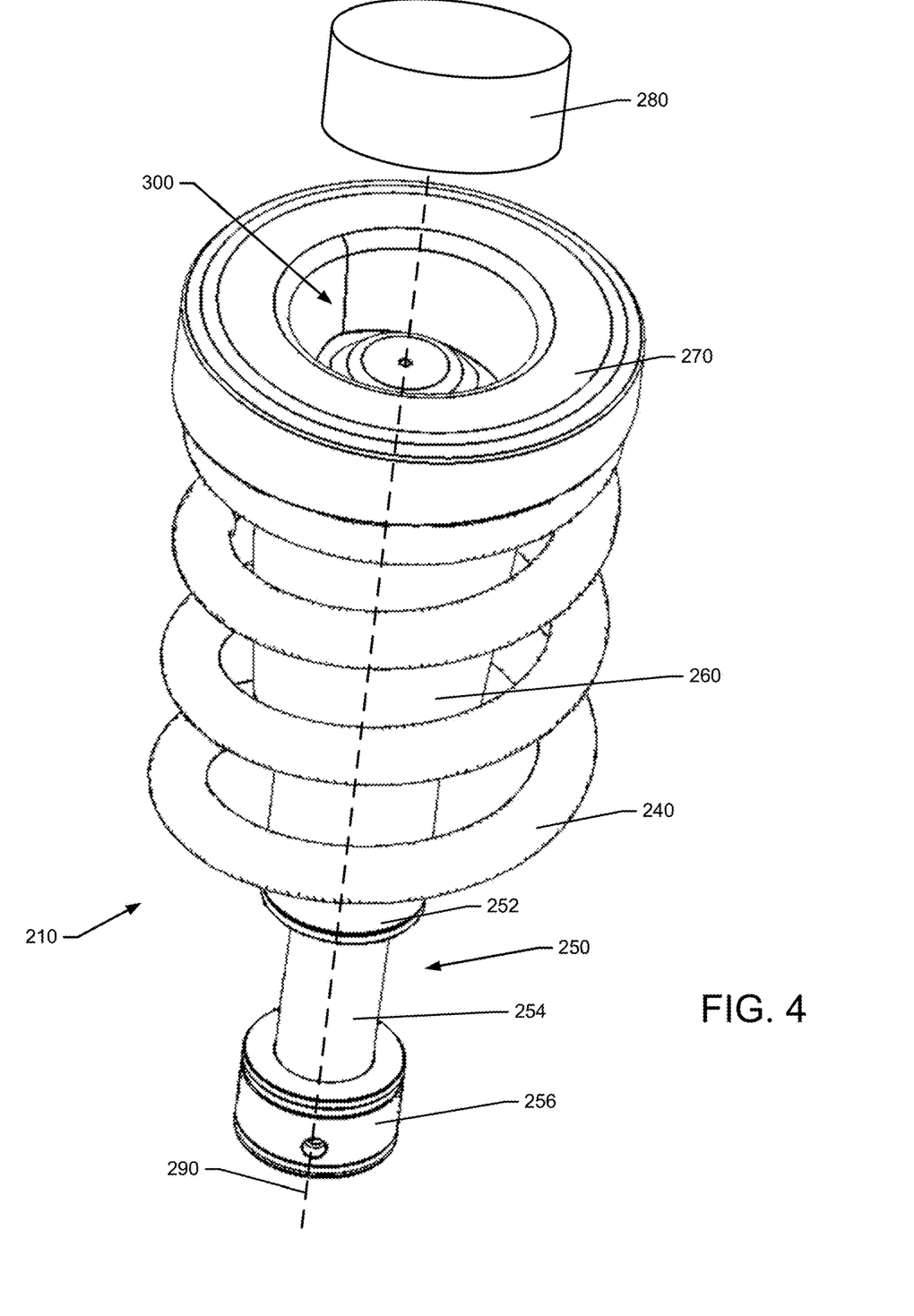
FIG. 4 illustrates a perspective view of the damping assembly in accordance with an example embodiment.

FIG. 4 illustrates a perspective view of the damping assembly 210 in accordance with an example embodiment. The perspective shown in FIG. 4 shows how the spring isolator 270 may be ring or annular shaped. In this regard, the spring isolator 270 may comprise a circular or cup shaped reception region 300 at the center of the spring isolator 270 which the locator 280 may operably couple with during installation of the damping assembly 210. As such, the locator 280 may be configured to not interfere with the hydraulic jounce bumper 250 that may also reside at the center of the damping assembly 210 and along the longitudinal axis 290. In other words, the locator 280 may contact the spring isolator 270 around a perimeter of the reception region 300 so as to leave space for the hydraulic jounce bumper 250 to be fit into operable coupling with the frame or body 120, without any need for additional brackets or weldments.

A damping assembly for a vehicle suspension system may therefore be provided. The damping assembly may include a spring including a first end operably coupled to a body of a vehicle and a second end operably coupled to a wheel of the vehicle, a spring isolator operably coupling the body of the vehicle to the first end of the spring, a hydraulic jounce bumper to dampen jounce forces on the vehicle, and a reinforcement member operably coupled to the hydraulic jounce bumper at a proximal end of the reinforcement member and to the spring isolator at a distal end of the reinforcement member. The reinforcement member may be integrated with the spring isolator at the distal end of the reinforcement member.

The damping assembly (or a suspension system including the same) of some embodiments may include additional features, modifications, augmentations and/or the like to achieve further objectives or enhance performance of the device. The additional features, modifications, augmentations and/or the like may be added in any combination with each other. Below is a list of various additional features, modifications, and augmentations that can each be added individually or in any combination with each other. For example, the reinforcement member may be adjustably operably coupled to a sleeve of the hydraulic jounce bumper. In an example embodiment, reinforcement member may be operably coupled to the sleeve of the hydraulic jounce bumper via a threaded connection. In some cases, a locking nut may be used to lock the threaded connection between the reinforcement member and the hydraulic jounce bumper. In an example embodiment, the reinforcement member may be fixed to a sleeve of the hydraulic jounce bumper. In some cases, the spring isolator may be operably coupled to a locator operably coupled to the body, and the locator may extend into the spring isolator to prevent separation of the spring isolator from the locator during a rebound event. In an example embodiment, the spring isolator may be operably coupled to the body without welds or brackets. In some cases, reinforcement member may be integrated with the spring isolator via shock absorbent material of the spring isolator being molded over a distal end of the reinforcement member. In an example embodiment, a flared end portion may be disposed at the distal end of the reinforcement member, and the flared end portion may be entirely surrounded by and captured within the spring isolator. In some cases, an amount of material of the spring isolator between the flared end portion and the body may be substantially consistent at all portions of a periphery of the flared end portion, and an amount of material of the spring isolator between the flared end portion and the spring may change at least at some portions of the periphery of the flared end portion.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A damping assembly for a vehicle suspension system, the damping assembly comprising:
   a spring comprising a first end operably coupled to a body of a vehicle and a second end operably coupled to a wheel assembly of the vehicle;
   a spring isolator operably coupling the body of the vehicle to the first end of the spring;
   a hydraulic jounce bumper to dampen jounce forces on the vehicle; and
   a reinforcement member operably coupled to the hydraulic jounce bumper at a proximal end of the reinforcement member and to the spring isolator at a distal end of the reinforcement member,
   wherein the reinforcement member is integrated with the spring isolator at the distal end of the reinforcement member,
   wherein the reinforcement member is adjustably operably coupled to a sleeve of the hydraulic jounce bumper.

2. The damping assembly of claim 1, wherein the reinforcement member is operably coupled to the sleeve of the hydraulic jounce bumper via a threaded connection.

3. The damping assembly of claim 2, wherein a locking nut is used to lock the threaded connection between the reinforcement member and the hydraulic jounce bumper.

4. The damping assembly of claim 1, wherein the spring isolator is operably coupled to a locator operably coupled to the body, and
   wherein the locator extends into the spring isolator to prevent separation of the spring isolator from the locator during a rebound event.

5. The damping assembly of claim 1, wherein the spring isolator is operably coupled to the body without welds or brackets.

6. The damping assembly of claim 1, wherein the reinforcement member is integrated with the spring isolator via shock absorbent material of the spring isolator being molded over the distal end of the reinforcement member.

7. The damping assembly of claim 6, wherein a flared end portion is disposed at the distal end of the reinforcement member, and
   wherein the flared end portion is entirely surrounded by and captured within the spring isolator.

8. The damping assembly of claim 7, wherein an amount of material of the spring isolator between the flared end portion and the body is substantially consistent at all portions of a periphery of the flared end portion, and an amount of material of the spring isolator between the flared end portion and the spring changes at some portions of the periphery of the flared end portion.

9. A vehicle suspension system, the vehicle suspension system comprising:
   a wheel assembly of a vehicle;
   a body of the vehicle; and
   a damping assembly operably coupling the wheel assembly and the body to dampen impacts on the body of the vehicle responsive to jounce and rebound events experienced at the wheel assembly,
wherein the damping assembly comprises:
a spring comprising a first end operably coupled to the body of a vehicle and a second end operably coupled to the wheel assembly of the vehicle;
a spring isolator operably coupling the body of the vehicle to the first end of the spring;
a hydraulic jounce bumper to dampen jounce forces on the vehicle; and
a reinforcement member operably coupled to the hydraulic jounce bumper at a proximal end of the reinforcement member and to the spring isolator at a distal end of the reinforcement member,
wherein the reinforcement member is integrated with the spring isolator at the distal end of the reinforcement member,
wherein the reinforcement member is adjustably operably coupled to a sleeve of the hydraulic jounce bumper.

10. The vehicle suspension system of claim 9, wherein the reinforcement member is operably coupled to the sleeve of the hydraulic jounce bumper via a threaded connection.

11. The vehicle suspension system of claim 10, wherein a locking nut is used to lock the threaded connection between the reinforcement member and the hydraulic jounce bumper.

12. The vehicle suspension system of claim 9, wherein the spring isolator is operably coupled to a locator and wherein the locator is operably coupled to the body.

13. The vehicle suspension system of claim 9, wherein the spring isolator is operably coupled to the body without welds or brackets.

14. The vehicle suspension system of claim 9, wherein the reinforcement member is integrated with the spring isolator via shock absorbent material of the spring isolator being molded over the distal end of the reinforcement member.

15. The vehicle suspension system of claim 14, wherein a flared end portion is disposed at the distal end of the reinforcement member, and
wherein the flared end portion is entirely surrounded by and captured within the spring isolator.

16. The vehicle suspension system of claim 15, wherein an amount of material of the spring isolator between the flared end portion and the body is substantially consistent at all portions of a periphery of the flared end portion, and an amount of material of the spring isolator between the flared end portion and the spring changes at some portions of the periphery of the flared end portion.

* * * * *